US005392927A

United States Patent [19]

Haverkamp Begemann et al.

[11] Patent Number: 5,392,927

[45] Date of Patent: Feb. 28, 1995

[54] SORTING APPARATUS FOR CD, MICRO-CASSETTE AND VIDEO TAPE OR SIMILAR ARTICLE

[75] Inventors: Aris P. Haverkamp Begemann, Heemstede; Ernestus J. M. van Hattum, Delft, both of Netherlands

[73] Assignee: Promech Sorting Systems B.V., Netherlands

[21] Appl. No.: 212,659

[22] Filed: Mar. 11, 1994

Related U.S. Application Data

[63] Continuation of Ser. No. 992,088, Dec. 17, 1992, abandoned.

[30] Foreign Application Priority Data

Dec. 20, 1991 [NL] Netherlands .......................... 9102147

[51] Int. Cl.[6] .......................... B07C 5/00; B65G 59/06

[52] U.S. Cl. .................................... 209/583; 209/587; 209/651; 209/917; 198/370; 198/483.1; 414/797.9; 235/470

[58] Field of Search ............... 209/583, 587, 596, 651, 209/900, 912, 917; 198/370, 372, 418.3, 483.1; 414/797.6, 797.9; 235/470, 475, 476, 477, 479

[56] References Cited

U.S. PATENT DOCUMENTS

| | | | |
|---|---|---|---|
| 2,872,020 | 2/1959 | Hansel et al. | 198/418.3 |
| 3,368,672 | 2/1968 | Heaney et al. | 209/900 X |
| 3,656,636 | 4/1972 | Komstantin | 414/797.9 |
| 3,880,751 | 4/1975 | Wirth | 198/370 X |
| 4,129,205 | 12/1978 | Anderson et al. | 198/358 |
| 4,778,062 | 10/1988 | Pavie et al. | 209/900 X |

FOREIGN PATENT DOCUMENTS

| | | |
|---|---|---|
| 385256 | 3/1988 | Austria . |
| 2755390 | 12/1978 | Germany . |
| 113041 | 6/1966 | Netherlands . |
| 885929 | 1/1962 | United Kingdom . |
| 1154122 | 6/1969 | United Kingdom . |

*Primary Examiner*—D. Glenn Dayoan
*Assistant Examiner*—Tuan N. Nguyen
*Attorney, Agent, or Firm*—Lalos & Keegan

[57] ABSTRACT

Sorting apparatus for flat, stackable articles, such as CDs, micro-cassettes, video tapes or similar articles. A single article is continuously removed from a stacked stock at the bottom side of the stack, and is then coded and moved forward by pushing members of a conveyor along an horizontal path, which is inclined transverse to the direction of travel. A series of discharge stations are positioned at the lower side of said path. The code applied ensures that each article is discharged at the correct station. Characterizing features of the apparatus are:

1) the slanting position of both the stock, the path of travel and the conveyor;
2) the adjustable bottom construction of the stock holder in conjunction with the pushing members of the conveyor.
3) the transparent first portion of the path along which the objects are moved by the conveyor with scanning means and additional printers for stickers to be applied upon the passing articles.

7 Claims, 4 Drawing Sheets

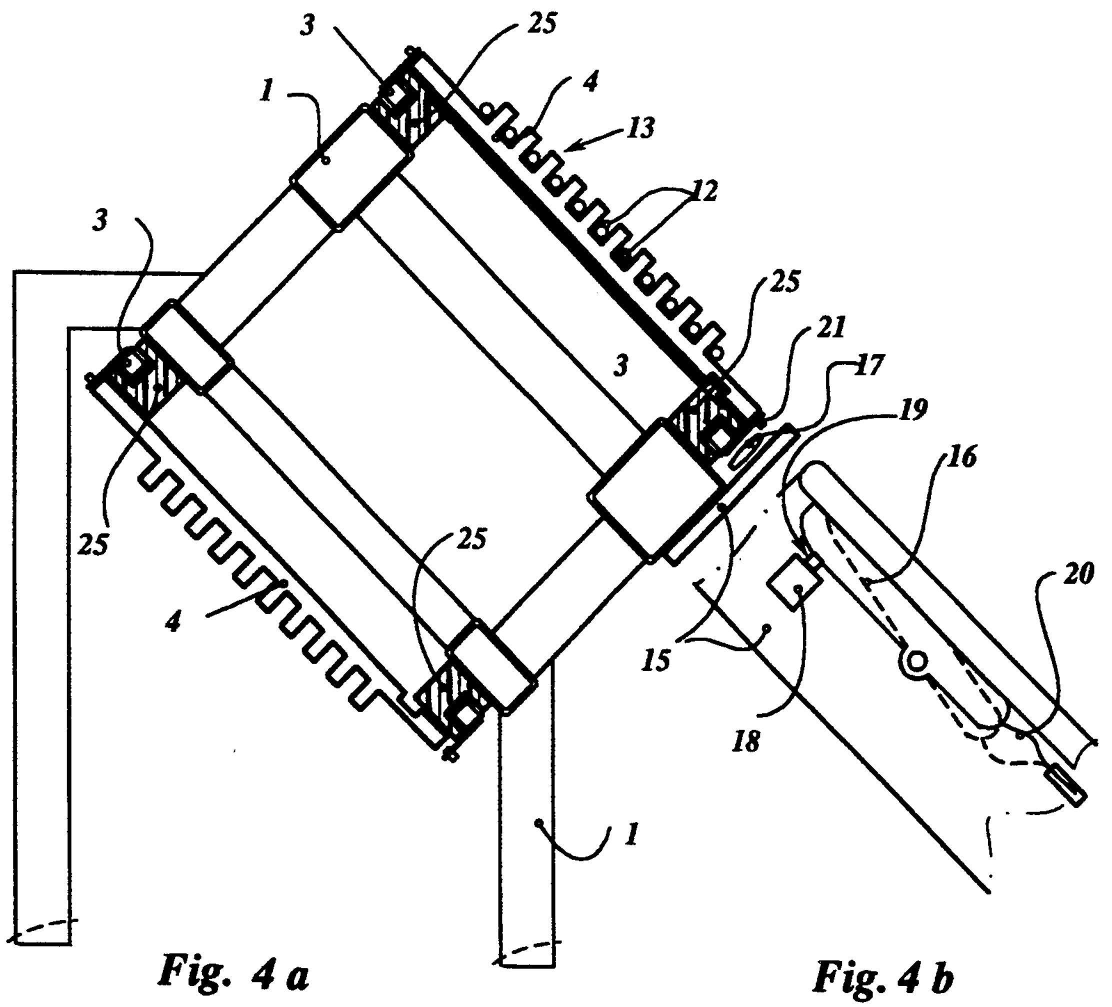
Fig. 4 a
Fig. 4 b
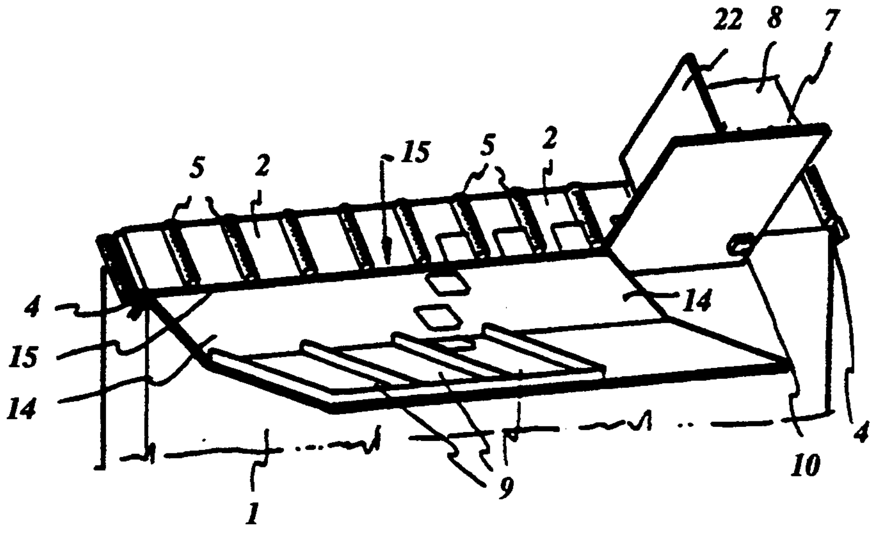
Fig. 5

SORTING APPARATUS FOR CD, MICRO-CASSETTE AND VIDEO TAPE OR SIMILAR ARTICLE

This is a continuation of copending application Ser. No. 07/992,008, filed on Dec. 17, 1992, now abandoned.

BACKGROUND OF THE INVENTION

The invention relates to a device for selecting and distributing articles from a stock. Such sorting devices are often used at mail-order companies for assembling mail-order packages which are each filled with contents which match the requirements or in particular the order of the addressee (the customer).

DISCUSSION OF THE PRIOR ART

Examples of such a device for selecting letters are described in U.S. Pat. Nos. 3,368,672 and 3,219,204, in the name of Richard HEANEY and Bernard SASSEN. The known devices described herein show at least one driven endless conveyor travelling along an essentially horizontal path, and comprising pushing members for advancing said articles, which path of travel is inclined transverse to the travelling direction of the conveyor, said device further comprising a number of discharge stations along said path and coding means for giving each article a code related to the envisaged discharge station, each pushing member of the conveyor continuously picking up one article from the stock, then carrying it along said path, and finally delivering it to the desired discharge station.

OBJECT OF THE INVENTION

A first object of the invention is, on the one hand, to make use of this known principle but, on the other hand, to provide such a design or adaptation that the device can be used for selecting and distributing flat, stackable articles such as CDs, micro-cassettes or videotapes. On application of the conventional technique to these last-mentioned articles it is found that the existing devices are too large in size and cannot simply be reduced to a dimension which is suitable for the format of such articles. When the conventional sorting equipment is reduced in size one is left with an inefficient use of space, which means that only a limited sorting capacity can be achieved, since otherwise one has to resort to higher speeds, which makes the whole selection and sorting process more susceptible to breakdowns.

A further object of the invention is to provide a device for selecting and distributing stackable articles from a stock, made up of elements listed above, which new device permits a considerable increase in the processing capacity without it being necessary to resort to the use of too high a speed. These objects are achieved according to the invention in that the new device comprises a holder, with a grid-like bottom for taking up a stock of articles, at least the lower portion of said holder having a position perpendicular to and spaced from said path of travel, said pushing members being active above said path.

SUMMARY OF THE INVENTION

Through these features, particularly efficient use is made of gravity both for the supply of each article and for its delivery at the position of the envisaged discharge station. A minimum of moving parts is also required, which has an advantageous effect both on functioning and on the cost of the device.

Further features of the new device are related to the composition and the functioning of those elements which are essential for the smooth and undisturbed operation of the device.

The bottom of the holder for the articles to be selected and distributed, is composed of a number of parallel rods which are jointly adjustable into two positions: the lower position to permit the pushing members each to convey an article along the path of travel; the upper position of said bottom aiming at bringing the lowermost article within the holder out of reach of the pushing members, thus stopping the operation.

The provision of an additional scanning possibilty of each article pushed out of the holder, by means of a transparent first portion of the path of travel.

The possibility to apply upon each article legible information for the future consumer, about title, price ect by means of a printed sticker.

The presence near each discharge station of a cam or tongue which is activated by computerized date within the system, for permitting a passing article to slide into the selected discharge station; after which the cam is brought back to its inactive position by mechanical contact with a passing next pushing member.

The device can be adapted to the thickness of the articles to be sorted out by means of a resilient lip in the lower part of the downstream side of the holder; the distance of said lip relative to the grid-like bottom (in its lower postion) can be adjusted such that each pushing member will take away only one article; an adhering second article is prevented by said lip to be conveyed.

The pushing members float above the path of travel by means of their support at both ends to a chain guided within a beam extending below the surface of said path.

The above and further advantages of the present device will be explained in greater detail with reference to the drawings showing an embodiment of said device.

BRIEF DESCRIPTION OF THE DRAWINGS

FIG. 4A shows a portion of FIG. 3 on an enlarged scale.

FIG. 4B is a side view of a detail from FIG. 4A.

FIGS. 5 gives an overall picture of an embodiment of the present invention on a reduced scale.

DETAILED DESCRIPTION OF A PREFERRED EMBODIMENT

Figure 1:
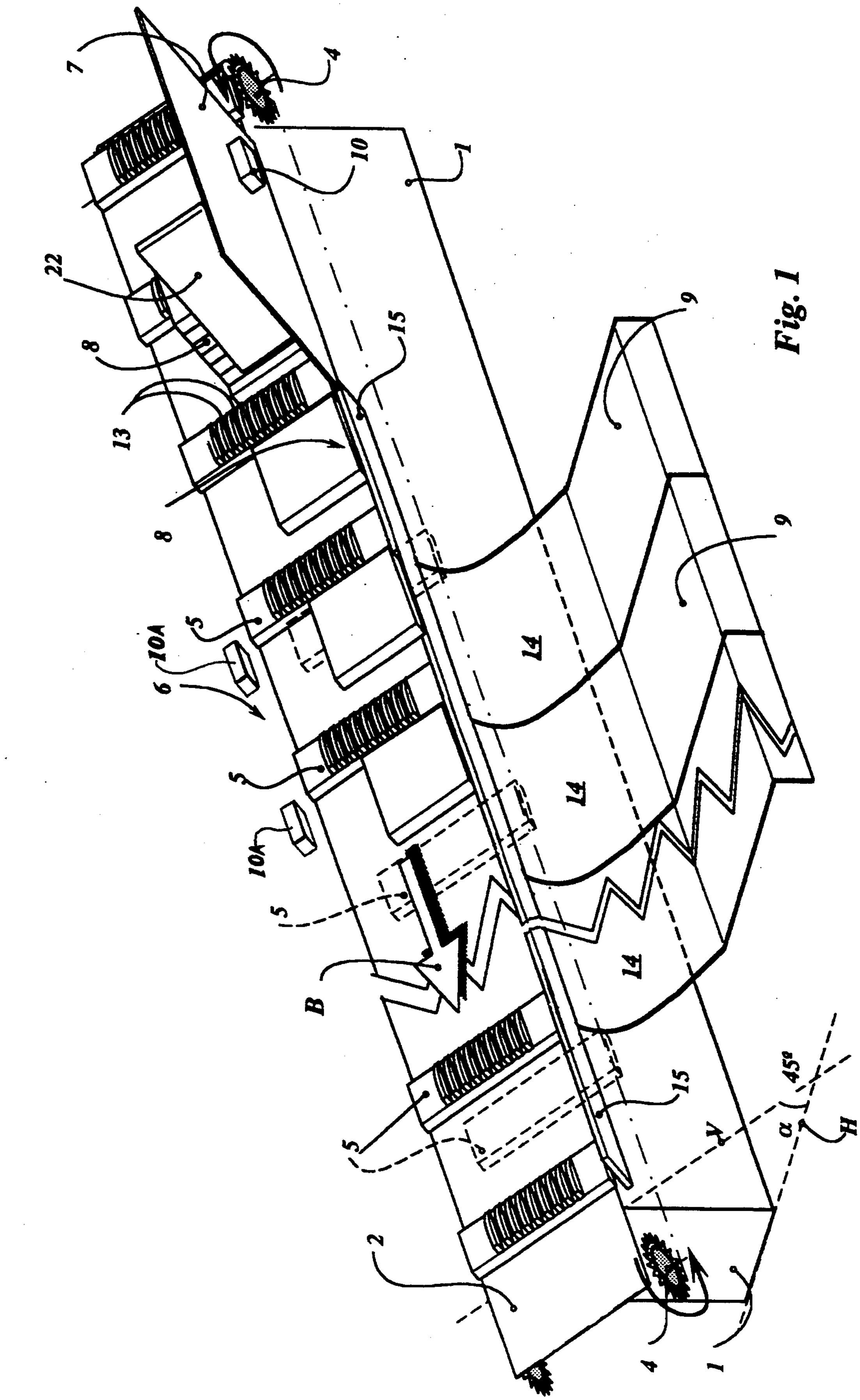
FIG. 1 gives a perspective view of the device with a cut-away middle portion.

As can best be seen in FIG. 1, the device comprises a frame 1 on which a path of travel 2 is supported. On both longitudinal sides of this path 2 a driven endless chain 3 is provided, guided by two end rollers 4. Both chains 3 support a plurality of pushing members 5 moving along path 2. Path 2 is essentially horizontal and is inclined in transverse direction. The position of this slanting path of travel as shown in FIG. 1 is about 45°. This position is determined by lines each lying in a plane at right angles to the path of travel 2. These imaginary lines each form an angle $\alpha$ with the horizontal H. This angle $\alpha$ can have a value lying between 25° and 70°.

As will be clear, the pushing members 5 with the chains 3 form the conveyor 6 of the present device. At the beginning of the path of travel 2 of this conveyor 6 (the upstream side), there is a holder 7 for storing a stock of flat articles 8 such as a CD, micro-cassette or video tape. The device also comprises a number of discharge stations 9, lying along the path of travel 2 of the conveyor 6. The device is further provided with conventional coding means 10, which are therefore shown very schematically in FIG. 1, for storing a destination code related to the envisaged discharge station 9 either to a data bank associated to the device, or to each passing article individually, and conventional means 10A for reading the destination code.

At least one holder 7 is present at the start of the path of travel 2 of the conveyor 6, for accommodating a stack of flat articles 8 to be distributed. Each holder 7 is situated essentially at right angles to the slanting face of the path 2. This holder 7 has a grid-like bottom 11 which is situated above the path 2, said bottom showing a number of slits lying parallel to the forward direction of movement of the conveyor 6. The bottom 11 is formed by a number of parallel rods 12. Each pushing members 5 of the conveyor 6 is provided with upstanding teeth 13, which can pass through said slits for taking along the lowest article 8 of the stack resting directly on the grid-like bottom 11.

A number of further design details of the device will be explained below, but it can already be stated at this point that with the present device a large number of identical articles can be taken individually along at high speed from the stack in the holder 7 for delivery to one of the discharge stations 9. The lowest article 8 from the stack is taken along by the teeth 13 of each pushing member 5. Previously a code has been applied to said article e.g. by means of the coding means 10. The article taken moves along with the corresponding pushing member 5 until the appropriate discharge station 9 is reached. At that moment the article concerned is released in a manner yet to be described, and can slide along a slanting intermediate plane 14 towards the aimed discharge station.

The discharge stations 9 are situated adjacent to the lower side of the intermediate plane 14 along the conveyor 6. The device is also provided with means for preventing and for permitting sliding of the moving articles 8 off the path of travel 2. In the embodiment shown in FIG. 4A, the means for preventing the articles 8 from sliding off, comprise a fixed raised edge 15. This edge is situated at a slight distance along the lower side of the path of travel 2 of the conveyor 6.

The means for permitting the articles to slide off the path 2 are formed by a cam or tongue 16. This cam lies in a narrow space 17 between the lower side of the path 2 and the fixed raised edge 15.

There is a cam 16 for each discharge station 9. The cam 16 is tiltable between two positions shown in FIG. 4B. Normally the cam lies in its inactive position shown in full lines. Under these circumstances the passing articles 8, travelling along the path 2, will be prevented from sliding downwardly towards the intermediate plane 14 by the fixed raised edge 15. As soon as an article approaches which must be discharged towards a neighbouring station, a short signal is given to a solenoid 18 positioned under the cam 16. A core 19 will emerge and will push the cam 16 to its active position, shown in dotted lines in FIG. 4B.

A leaf spring 20 will keep the cam 16 in this active position. The first passing article 8 will be lifted beyond the edge 15 and will consequently slide downwardly along the plane 14 and will land into the appropriate discharge station 9. Each pushing member 5 is provided with a sideward extension 21, which, upon passing, will urge the concerning cam 16 back from the active to its inactive position. The leaf spring 20 will hold the cam in this new position.

The downstream side face 22 of the holder 7 is spaced from the grid-like bottom 11, such that there is sufficient space for the thickest article 8 to be conveyed from the lower portion of the stock by means of a passing pushing member 5. In order to prevent a second article to be conveyed simultaneously, a resilient lip 23 is pivotally mounted upon the face 22. This lip will rub upon the article 8 conveyed by a pushing member 5 from the stock within the holder 7. The position in vertical direction of the rubbing lip 23 and consequently its distance from the bottom 11, can be adjusted for adaptation to the thickness of the articles 8.

Figure 2:
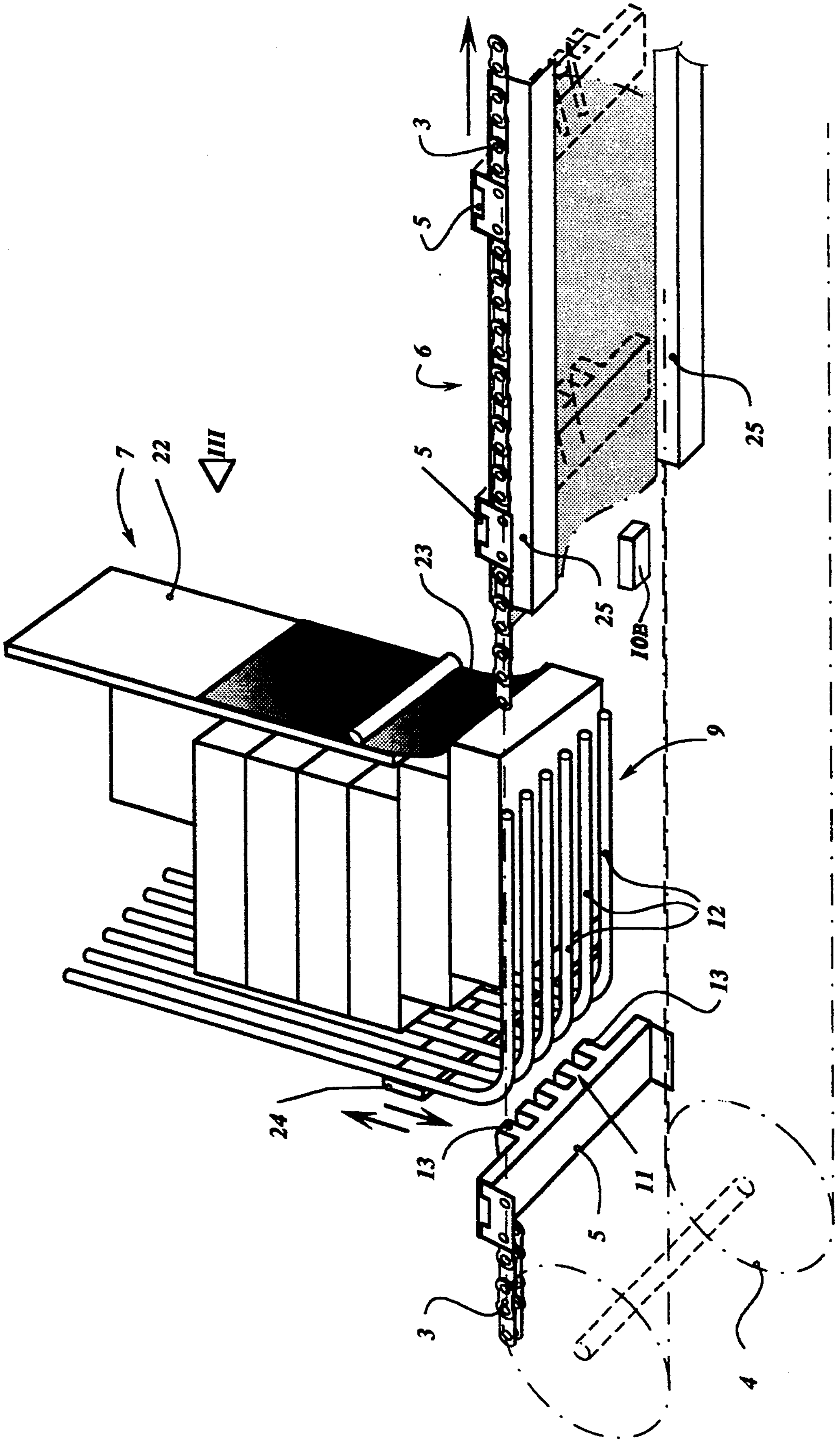
FIG. 2 gives a picture of the first part of the device, viewed from below, corresponding to the arrow II in FIG. 3.
Figure 3:
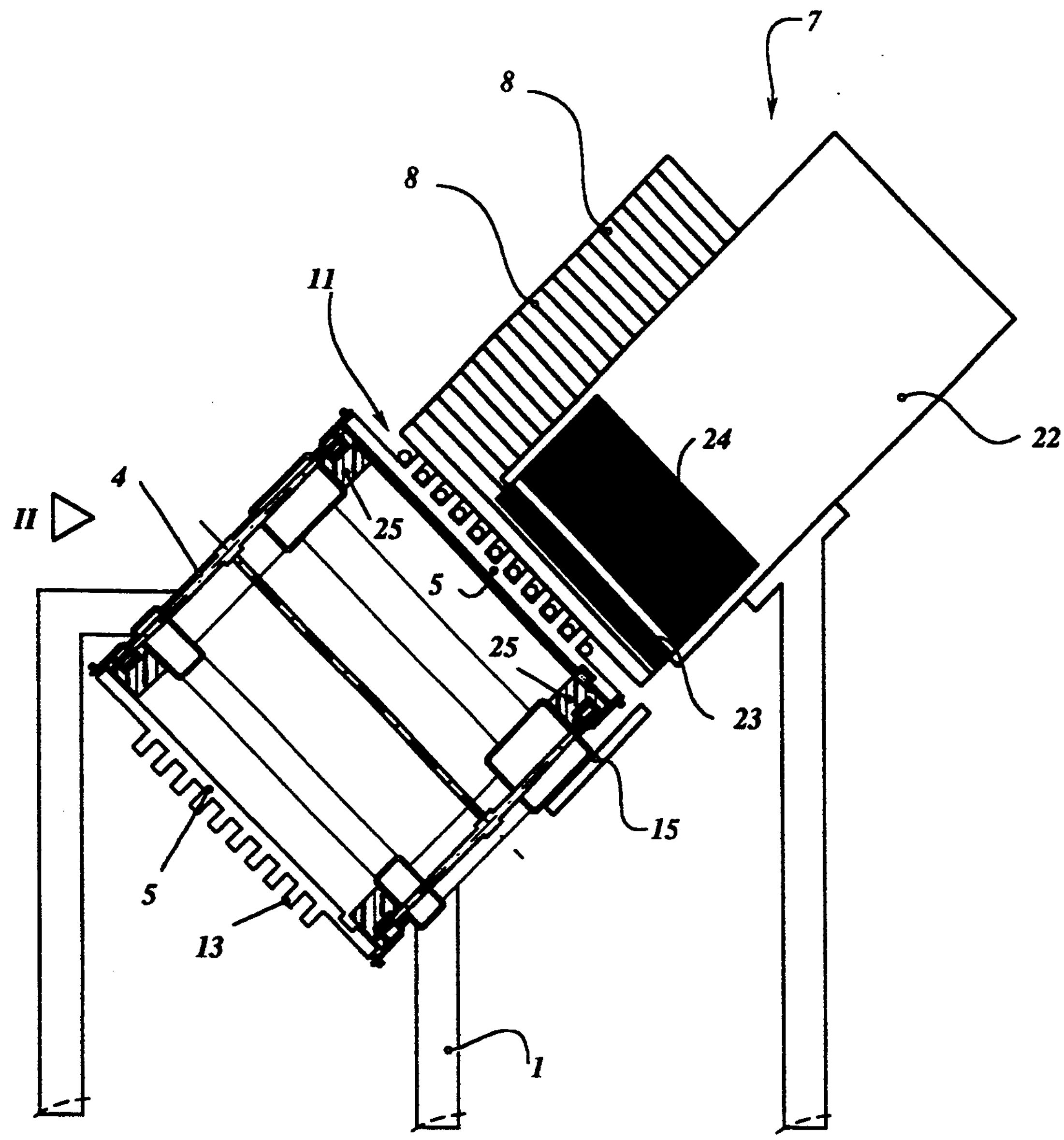
FIG. 3 is a side view from the right side of FIG. 2 in the direction of the arrow III.

As can be seen in FIG. 2, the rods 12 of the grid-like bottom 11 of the stock holder 7 are jointly adjustable in a direction transverse to the slanting face of the path 2. The upper portion of the teeth 13 of the pushing members 5 will continuously pass through the slits between the rods 12 of the bottom 11. In the normal operative condition of the device, the teeth 13 will emerge above the surface of the rods 12 and will consequently periodically convey the lowermost article 8 resting upon the bottom 11. By slightly raising the bottom, it is possible to interrupt the operation, as soon as the teeth 13 will no longer protrude above the rods 12. The position of the bottom 11 can be adjusted by means of a setting element 24. Consequently the conveyor 6 with the pushing members 5 can continue to move without any article to be carried along. This facility can also be used on starting up the sorting of a new type of article, for example when changing over from a CD to a micro-cassette or to video tapes.

The first portion of the path 2 lying downstream of the holder 7 is made of transparent material. This renders it possible to scan additional information with optical scanning means 10B from the bottom face of each article 8 travelling over said portion. This information may relate to the author, the title, the price and the artist or any further interesting data. In a second portion of the path 2, it is possible to provide one or more printers, capable of printing the data from the above scanner in legible form upon a sticker, which is applied (for instance by blowing) upon the related article 8.

FIG. 4A shows the pushing members 5 being supported at both ends upon a chain 3 guided in a beam 25 of synthetic material. In this manner the members 5 will float above the path 2, reducing considerably possible friction.

What is claimed is:

1. A device for selecting and distributing stackable articles from a stock, comprising:

at least one driven endless conveyor communicating with a holder for stocking said articles, said holder including a grid-like bottom comprising a plurality of rods extending in the travelling direction of said conveyor and spaced in the transverse direction;

said conveyor travelling along a path, said path being essentially horizontal and including an incline in a direction transverse to the direction of travel, at least the lower portion of said holder having a position perpendicular to and spaced from said path;

a plurality of discharge stations along said path for receiving said articles;

a plurality of pushing members mounted upon and spaced along said path for taking an article from said holder, advancing said article along said path, and delivering said article to said discharge station, said pushing members being active above said path, each of said pushing members extending transversely to the direction of travel and including a forward face and an upper surface and comprising a plurality of teeth disposed longitudinally along the upper surface thereof passing between said rods, said pushing member contacting said article at the forward face thereof when said teeth are passed between said rods;

a coding means for giving each article a destination code related to one of said discharge stations; and means for reading said destination code and discharging said article to an appropriate discharge station;

optical scanning means located in said path of travel beyond said holder for the registration of coded information available upon a surface of article taken from the holder and advanced by a pushing member along said path.

2. A device according to claim 1, wherein said rods of said grid-like bottom of said holder are jointly adjustable perpendicularly to the path of travel between a lower and an upper position, said lower position permitting each pushing member to convey an article along said path of travel, said upper position bringing the lowermost article out of reach of said teeth.

3. A device according to claim 1, wherein said additional optical scanning means are located under a transparent portion in said path for the registration of said coded information readable on the lower face of each passing article.

4. A device according to claim 3, further comprising means for applying information upon a passing article, said applying means located along said path between said transparent portion said path of travel and the first discharge station.

5. A device according to claim 4, wherein said applying means is operable with information stickers adhered to a passing article.

6. A device according to claim 1, further comprising:

a sliding plane adjacent to said discharge stations and adjoining the lowermost side of the path of travel of the conveyor, a first stationary means for preventing the sliding of a moving article towards a discharge station, and a second movable means at each discharge station, movable between an active and an inactive position for permitting the sliding of a moving article towards a discharge station, wherein each of said movable means is moved to its active position by a signal originating from the destination code of a passing article and is urged back to its inactive position by a passing..pushing member of the conveyor.

7. A device according to claim 1, wherein each pushing member is supported at both ends by an endless chain guided within a beam lying on both sides below the surface of the path of travel.

* * * * *

UNITED STATES PATENT AND TRADEMARK OFFICE
CERTIFICATE OF CORRECTION

PATENT NO. : 5,392,927

DATED : February 28, 1995

INVENTOR(S) : Aris P. Haverkamp Begemann, et al.

It is certified that error appears in the above-identified patent and that said Letters Patent is hereby corrected as shown below:

In Claim 1, column 5, line 24, the word "each" should precede "article".

Signed and Sealed this

Twenty-fifth Day of April, 1995

Attest:

BRUCE LEHMAN

*Attesting Officer*

*Commissioner of Patents and Trademarks*